March 24, 1925.
R. B. LEWIS
EXTENSOMETER
Filed Oct. 20, 1921
1,531,111
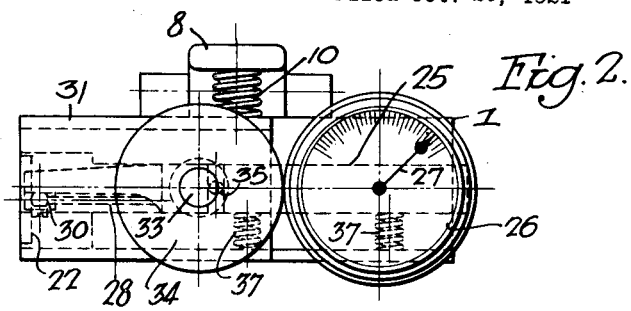
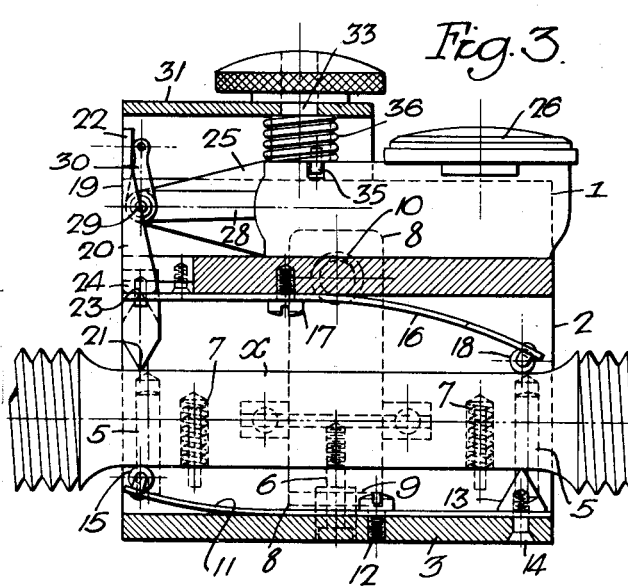
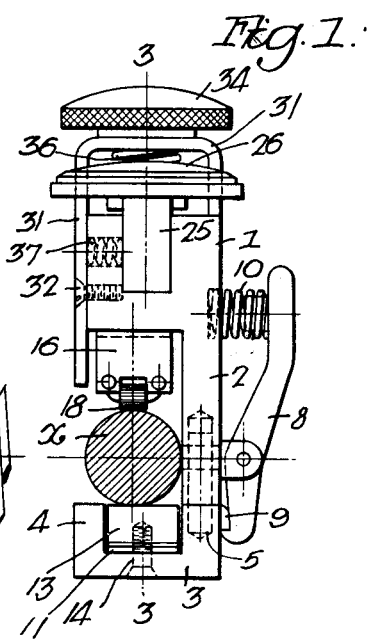
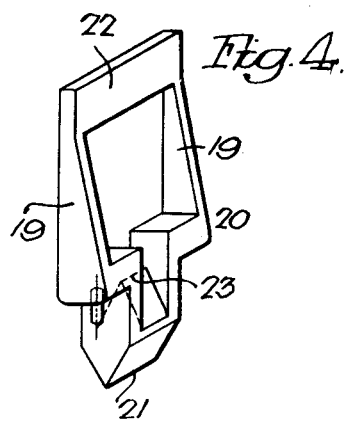
Inventor—
Robert B. Lewis.
by his Attorneys—
Howson & Howson Patented Mar. 24, 1925.

1,531,111

UNITED STATES PATENT OFFICE.

ROBERT B. LEWIS, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

EXTENSOMETER.

Application filed October 20, 1921. Serial No. 509,115.

*To all whom it may concern:*

Be it known that I, ROBERT B. LEWIS, a citizen of the United States, residing in Philadelphia, Pennsylvania, have invented Extensometers, of which the following is a specification.

One object of my invention is to provide a simple and accurate instrument for automatically indicating or recording the expansion or contraction of a test bar of any section and the invention especially contemplates a compact instrument which may be quickly and conveniently applied to or detached from a test specimen.

It is further desired to provide an extensometer having the above characteristics which shall indicate and follow the changes in length of a test specimen resultant upon the application thereto of a deforming stress and shall thereafter return to zero when it is unloaded or the stress is removed from the specimen.

Another object of the invention is to provide a device of the character above noted which may be quickly and easily adjusted after application to the test specimen to bring its indicator to the zero position and which shall accurately follow and record the changes in length of such specimen when it is subjected to a deforming stress.

These objects and other advantageous ends I attain as hereinafter set forth, reference being had to the accompanying drawings, in which, Figs. 1 and 2 are respectively an end elevation and a plan of an extensometer constructed in accordance with my invention;

Fig. 3 is a vertical section on the line 3—3, Fig. 1; and

Fig. 4 is a perspective view of the movement-transmitting lever forming part of my invention.

In the above drawings, 1 represents the main part of the body or frame of my instrument which may be described as a block of substantially rectangular section having on one side a projecting flange 2 to which is movably connected a member 3 of U-shaped section, one of whose sides forms an extension or continuation of the part 2 of the frame body. The other side or free edge of the member 3 is turned up towards the body 1 as indicated at 4 to cooperate with it in defining a more or less elongated channel or recess for the reception of the body *x* of a test bar or other specimen whose changes in length are to be recorded.

Dowel pins 5 are fixed in one edge of the member 3 so as to slidably project into suitable holes in the adjacent edge of the extension 2 and the distance said member is permitted to move away from the body on said guiding dowels is determined by a screw or bolt 6 threaded into said extension and having its head countersunk and slidable in a suitable recess in said member 3. The latter is at all times pressed away from the body of the frame by a pair of springs 7 set in recesses in the side of the member 3 adjacent the extension 2 and projecting into the latter.

For separably holding the member 3 with one of its edges in engagement with the adjacent edge of the extension 2 of the body, I provide a hooked lever 8 mounted on the latter and designed to engage a lug 9 on the member 3. By means of a spring 10 acting between the long arm of said lever and the adjacent portion of the frame body, I cause the opposite and hooked end of said lever to tend to remain in engagement with said lug, so that by depressing the long arm of the lever 8 against the action of the spring 10, its hooked end may be freed from the lug 9 thereby permitting the specimen-retaining member 3 to move away from the frame body under the action of the spring 7 to a distance determined by the bolt or screw 6.

Within the hollow of the member 3 I mount a flat spring 11 fixed in position by a screw 12 and having its ends terminated adjacent the ends of said frame. One end has mounted on and rigidly fixed to it and to said member a knife edge 13 rigidly held in place by a screw 14. The other end of the spring 11 is bowed away from the bottom of the channel thereof and carries a contact roller 15. Similarly mounted within the upper part of the recess or space defined by the body of the frame 1 and its extension 2 is a second spring 16 held in place by a screw 17 and having a free downwardly bowed end opposite the knife edge 13 and carrying a contact roller 18.

At the end of the instrument opposite that having said roller 18, the sides of the block 1 are cut away to receive the branches 19 of a lever 20 having a short arm terminating in the knife edge 21 positioned to engage a test specimen opposite the contact roller 15. The ends of the branches 19, constituting the long arm of said lever 20, are joined by an integral cross plate having a flat face 22, in addition to which said lever has a second and inner knife edge 23 designed to engage a fulcrum in the form of a hardened plate 24 mounted on the end of the body 1.

The upper side of the frame or body constituted by the block 1 is longitudinally recessed for the reception of an indicating or recording device which consists of an elongated body 25 mounted to slide longitudinally in this recess of the frame and carrying at one end a dial 26 provided with a scale and a cooperating indicating needle 27.

By mechanism well known to the art and forming no part of the present invention this needle is operatively connected to the free end of a relatively long lever arm 28 pivoted at 29 to the body 25 of the instrument and having a short arm 30 whose free end extends immediately adjacent to and is movable into engagement with the flat face of the cross bar 22 of the long arm of the lever 20. An angular plate 31 held to the side of the block 1 by a screw 32, extends over the recessed top edge of said block and is thereafter extended downwardly into engagement therewith for the purpose of adjustably retaining the indicating device in place. For moving said device longitudinally in the slot of the block 1 in order to cause the short lever arm 30 to be brought into engagement with the adjacent flat face of the cross bar 22, I mount in the plate 31 a short spindle 33 having a head 34 and provided with a pin 35 projecting eccentrically from its inner end into a transverse slot in the upper side of the body 25 of the indicating device. A spring 36 mounted on this spindle serves to normally hold said device in place toward the bottom of the slot of the instrument body and the device is laterally positioned by other springs 37 mounted between one side and the adjacent side portion of the retaining plate 31.

Under conditions of use it is understood that the specimen $x$ is mounted in a testing machine so that it may be subjected for example to stress so tending to elongate or shorten it. In order to determine its change of length under the conditions of such tests, I depress the long arm of the lever 8 of my instrument so that the member 3 moves away from the body 1 and thereafter apply said instrument to the test specimen so that the knife edge 13 and contact roller 18 engage it at one pair of opposite points and the the lever knife edge 21 and contact roller 15 engage it at a second pair of opposite points, there being thus a known length of the test specimen between the planes of these two pairs of points. To maintain this engagement the member 3 is pushed toward the body 1 of the instrument until the hooked end of the lever comes into holding engagement with the lug 9. My instrument is now held in place on the test bar, since the springs 11 and 16 yield to cause the knife edges 13 and 21 to cooperate with the contact rollers 15 and 18 to immovably grip said bar.

By rotation of the head 34 the indicating device is moved longitudinally in the slot of the body 1 so that the rounded end of its short arm 30 is brought into engagement with the flat face of the cross bar 22 of the lever, at a point whose distance from the line of contact of the knife edge 23 with the hardened plate 24, bears a definite ratio to the distance from this line to the specimen-engaging knife edge 21. By rotating the dial 26 of the indicating device in the manner well known to the art, the zero of the scale thereon is brought into accurate register with the indicating needle 27. Thereafter, as stress is applied to the test specimen, and owing to the fact that the knife edges 13 and 21 bite into or immovably engage it, the lever 20 is turned on its fulcrum as the length of said specimen increases or decreases, thereby actuating the short arm 30 of the indicating device and through the long arm 28, actuating the needle 27 thereof.

After the device has once been properly calibrated by properly adjusting the dimensions of the lever 20, the elongation of the known length of the test specimen between the knife edges 13 and 21 will be indicated by the needle 27 with the highest degree of accuracy and may be accurately followed during the test. At the termination of such test the device may be quickly released from the test bar by depressing the long arm of the locking lever 8, whereupon the member 3 will spring away from the test specimen, thus freeing the instrument from said bar.

By repeated and long continued experiments, I have found that the results obtained by the above described instrument are accurate in the highest degree and that the instrument is highly sensitive to changes in length of the test specimen to which it is applied. Not only are its readings reliable, but its construction is such that it is not likely to get out of order. Moreover it may be easily and quickly adjusted as well as applied to or removed from the specimen under test.

It is noted that as a result of the above described construction, if a specimen is stressed to some point within its elastic limit, the indicating needle of the instrument will return to zero position upon the removal of this stress.

I claim:

1. An instrument for indicating changes of length consisting of a supporting frame; members for gripping a test specimen of which one has a knife edge fulcrumed on said frame and includes a second knife edge for engaging the specimen and a movement indicating device actuated by said latter gripping member.

2. An instrument for indicating changes of length consisting of a frame; two specimen-engaging members thereon of which one is fixed to the frame and the other is free to rock on said frame; and a movement indicating device on the frame connected to be actuated by said second member.

3. An instrument for indicating changes of length consisting of a frame; a lever fulcrumed on the frame and adapted to engage a specimen; means on the frame for gripping the specimen; and a movement-indicating device connected to the lever.

4. An instrument for indicating changes of length including a frame; means for gripping a test specimen including two knife edges positioned to engage diagonally opposite points of said specimen; and a movement-indicating device operatively connected to one of said knife edges.

5. An instrument for indicating changes in length consisting of a frame; a movement indicating device adjustably mounted on the frame and including an actuating element; with members on the frame for gripping a test specimen of which one member is a lever operatively connected to said actuating element.

6. The combination of a frame; a movement-indicating instrument slidably mounted thereon and including a lever arm; and means on the frame for gripping a test specimen including a member extending into position to actuate said lever arm.

7. The combination in an instrument for indicating changes of length, of a frame; a movement-indicating device slidably mounted on said frame and including an actuating element; an adjusting member on the frame for said device; and members for gripping a test specimen of which one is operatively connected to the actuating element of said device.

8. The combination of a slotted frame; a movement-indicating instrument slidably mounted in the slot of said frame and having an actuating element; a rotatable member having a pin in operative engagement with said instrument for longitudinally moving it in the slot of the frame; and members for gripping a test specimen of which one is operatively connected to said actuating element.

9. The combination in an instrument for indicating changes of length, of a frame including a relatively movable member; specimen gripping elements carried respectively by said frame and by said member; means for holding the member to the frame with said elements in engagement with the test specimen; and a movement-indicating device on the frame actuated from one of said elements.

10. The combination of a frame; a member movably guided thereon; specimen engaging elements carried by the frame and by said member and including a lever fulcrumed on the frame; means for holding the member and the frame together with the elements in engagement with the test specimen; and a movement-indicating device operatively connected with said lever.

11. The combination of a frame; a member movably guided thereon; specimen-engaging elements carried by the frame and by said member and including a lever fulcrumed on the frame; means for holding the member and the frame together with the elements in engagement with the test specimen; a movement-indicating device including an element positioned to engage one arm of said lever; with an adjusting means for moving said device relatively to the lever.

12. The combination in an instrument for indicating changes of length, of a frame; a lever fulcrumed on the frame and having a sharp specimen-engaging arm; a movement-indicating device mounted on the frame and including an actuating element positioned to be engaged by the other arm of said lever; and members for gripping the specimen to the frame.

13. The combination in an instrument for indicating changes of length, of a frame; a lever fulcrumed on the frame and having a sharp specimen-engaging arm; a movement-indicating device mounted on the frame and including an actuating element positioned to be engaged by the other arm of said lever; and members for gripping the specimen to the frame including a knife edge and a yieldable member opposite thereto.

14. The combination in an instrument for indicating changes of length, two knife edges mounted to engage diagonally opposite points of a test specimen; two spring-supported rollers mounted to engage the specimen at points respectively opposite the knife edges; with a movement-indicating instrument mounted to be actuated by movement of one of the knife edges.

ROBERT B. LEWIS.